(12) United States Patent
Holcombe et al.

(10) Patent No.: US 7,139,391 B2
(45) Date of Patent: Nov. 21, 2006

(54) DAA HOOK SWITCH

(75) Inventors: Wayne T. Holcombe, Mountain View, CA (US); Matthijs D. Pardoen, Mountain View, CA (US)

(73) Assignee: Integration Associates, Inc., Mountain View, CA (US)

( * ) Notice: Subject to any disclaimer, the term of this patent is extended or adjusted under 35 U.S.C. 154(b) by 140 days.

(21) Appl. No.: 10/777,371

(22) Filed: Feb. 12, 2004

(65) Prior Publication Data

US 2004/0174986 A1    Sep. 9, 2004

Related U.S. Application Data

(63) Continuation-in-part of application No. 10/341,760, filed on Jan. 14, 2003, and a continuation-in-part of application No. 10/013,901, filed on Oct. 30, 2001.

(60) Provisional application No. 60/446,971, filed on Feb. 12, 2003, provisional application No. 60/348,963, filed on Jan. 14, 2002.

(51) Int. Cl.
*H04M 1/80* (2006.01)

(52) U.S. Cl. ........................... 379/393; 379/412
(58) Field of Classification Search ........... 379/393, 379/412, 443
See application file for complete search history.

(56) References Cited

U.S. PATENT DOCUMENTS

| | | | |
|---|---|---|---|
| 4,292,595 A | | 9/1981 | Smith |
| 4,419,543 A | * | 12/1983 | Kelm et al. ............. 379/393 |
| 4,465,903 A | | 8/1984 | Barber |
| 4,835,486 A | | 5/1989 | Somerville |
| 4,991,051 A | * | 2/1991 | Hung ..................... 379/412 |
| 5,105,461 A | * | 4/1992 | Tsurusaki et al. ...... 379/395.01 |
| 5,369,666 A | | 11/1994 | Folwell et al. |
| 5,500,895 A | | 3/1996 | Yurgelites |
| 5,633,925 A | * | 5/1997 | Handford et al. ........... 379/412 |
| 5,654,984 A | | 8/1997 | Hershbarger et al. |
| 5,692,041 A | * | 11/1997 | Torazzina ................. 379/413 |
| 5,790,656 A | | 8/1998 | Rahamim et al. |
| 5,870,046 A | | 2/1999 | Scott et al. |
| 5,946,393 A | | 8/1999 | Holcombe |
| 5,946,394 A | | 8/1999 | Gambuzza |
| 5,991,335 A | | 11/1999 | Price |

(Continued)

FOREIGN PATENT DOCUMENTS

EP    0 973 305 A1    1/2000

OTHER PUBLICATIONS

Allen et al., "CMOS Analog Circuit Design," HRW Series in Electrical and Computer Engineering, Chapter 7, pp. 349-357, Holt, Rinehart and Winston (1987).

*Primary Examiner*—Daniel Swerdlow
(74) *Attorney, Agent, or Firm*—Francissen Patent Law, P.C.; Vernon W. Francissen

(57) ABSTRACT

A hook switch circuit is shown wherein two high-voltage bipolar transistors, a PNP transistor Q1 and a NPN transistor Q2, that are connected in a regenerative feedback manner to form a bi-stable latch. The regenerative structure permits the use of low beta transistors that may be turned on with a low control current, but still conduct a sufficient off-hook current. Also shown is a polarity steering regenerative switch (MP1, MP2) that provides a power supply voltage from a telephone line pair and may be adapted for a polarity signal and can be combined with a current mirror (MP7) to produce a current signal proportional to the line voltage (LV1).

16 Claims, 7 Drawing Sheets

U.S. PATENT DOCUMENTS

| | | |
|---|---|---|
| 6,107,948 A | 8/2000 | Scott et al. |
| 6,137,827 A | 10/2000 | Scott et al. |
| 6,430,229 B1 | 8/2002 | Scott et al. |
| 6,498,825 B1 * | 12/2002 | Dupuis et al. ............... 379/412 |
| 6,587,560 B1 * | 7/2003 | Scott et al. ............ 379/413.02 |
| 6,654,409 B1 * | 11/2003 | Scott et al. ................. 379/412 |
| 6,785,383 B1 * | 8/2004 | Fan et al. .................... 379/393 |
| 6,876,742 B1 * | 4/2005 | Sacca ......................... 379/412 |
| 2001/0033190 A1 | 10/2001 | Bendall |
| 2001/0033650 A1 | 10/2001 | Wilson et al. |
| 2002/0130801 A1 | 9/2002 | Scott et al. |

* cited by examiner

DAA HOOK SWITCH

CROSS-REFERENCE TO RELATED PATENT APPLICATIONS

This application claims priority from provisional patent application 60/446,971 filed Feb. 12, 2004, which is related to U.S. Pat. No. 5,946,393 and is a continuation-in-part of co-pending U.S. patent application Ser. No. 10/013,901 for a METHOD AND APPARATUS FOR ISOLATION IN A DATA ACCESS ARRANGEMENT USING ANALOG ENCODED PULSE SIGNALING filed Oct. 30, 2001, and Ser. No. 10/341,760 for a METHOD AND APPARATUS FOR PULSE WIDTH MODULATION SIGNAL RECOVERY USING HIGH SPEED CLOCK SIGNAL WITH PHASES filed Jan. 14, 2003, which claims the benefit of U.S. Provisional Patent Application No. 60/348,963, filed Jan. 14, 2002, herein incorporated by reference in their entirety for all purposes.

FIELD OF THE INVENTION

The present invention is directed toward improvements in an electronic hook switch for use in a telephone line interface or a Data Access Arrangement (DAA).

BACKGROUND OF THE INVENTION

For telephone interfaces or for isolated DAAs, a controllable hook switch is necessary to close the telephone line loop current path in order to signal the telephone switch to answer or originate a call. Typically, a mechanical switch, an electro-mechanical relay, or an electronic switch provides this hook switch function. The minimum requirements of a hook switch are to block maximum normal line voltage (up to 300V), be able to pass up to 120 mA, and have an on-state resistance in the range of 0–100 ohms.

A hook switch may also provide dielectrical isolation between the switch and the control signal. Some examples of isolated hook switches are relays, mechanical switches, and optically isolated solid-state relays. However, dielectric isolation is not necessary for a hook switch if the source of the control signal is isolated. Such is the case in many electronic telephones or solid state DAAs. In these products, a controlling IC on the telephone line side generates signals that directly control the hook switch. The controlling IC responds to signals sent across a dielectrically isolated signaling means; such as, a transformer, optical isolator, or capacitor. In the current state of the art of DAAs, the hook switch commands are encoded along with audio and other signals that are sent across a shared isolated signal path.

Electronic hook switches are more commonly used in high volume telephone and DAA products because they offer lower cost than relays, consume less power, and are smaller. However, electronic hook switches are constructed from high voltage transistors and have difficulties being driven from integrated circuits fabricated in low voltage processes. One difficulty is that the control current available on a DAA integrated circuit (IC) is very low. Another difficulty is that often at least one transistor is required to high voltage level shift control outside of the operating voltage range of the controlling circuit. Collectively, level shifting and cascading of transistors to get sufficient current gain typically require the use of at least 3 high voltage, bipolar transistors. Fewer transistors can be used if a more expensive high voltage enhancement metal oxide semiconductor (MOS) or a depletion MOS high voltage transistor is used. (See the prior art schematics shown in FIG. 1)

To explain in greater detail: The most common low cost electronic hook switch uses at least 3 high voltage bipolar transistors. At least this many transistors must be used because the beta of a high voltage transistor is low, e.g. in the range of 20–100, and the control current from a controlling IC may only be in the range of 0.1–10 uA. The control current is low because during on-hook idle less than a few microamperes of current may be pulled from the line in order to meet regulatory requirements. Although higher current may be available if the controlling switch can directly switch from the line, such a switch must be able to withstand the 300V peak line voltage. In practice, the controlling IC is usually fabricated in a low cost 5 volt or less process and hence cannot be directly powered from the line voltage.

One general method to overcome the low control current available from the line or the inability to power the hook controlling IC directly from the line is to send low voltage power across the isolation barrier. Conexant presently illustrates this method in their DAAs using a small high frequency transformer to send AC power across the isolation barrier to power the DAA IC. Although this method is quite effective, the power transformer is relatively expensive.

Another method illustrated in the optically isolated solid state switch is to send power across the isolation barrier in the form of light from a light emitting diode (LED) which falls on a stack of photodiodes in series which produces sufficient voltage and current to drive the gate of a high voltage MOS transistor which acts as a hook switch. Although this method is low power, it is also relatively expensive, requiring an LED, a photovoltaic stack, and 1–2 high voltage MOS transistors in a specialized optical package. This approach is demonstrated in FIG. 1a.

Another method is to send power across isolation capacitors with an AC signal as disclosed by Silicon Laboratories (see, for example, U.S. Pat. No. 6,430,229). Although in capacitor isolated DAAs, controlling signals for hook and other functions are sent across capacitors, it is possible to send much more power across than is available from the line in idle mode. This is especially true where the isolation capacitors are in the range of 30 pF to 300 pF. With a 1 MHz AC signal with 5V peak-to-peak swing, up to 150 uA to 1.5 mA of current can be sent across these size capacitors. This level of current can be used to drive low-cost high-voltage bipolar transistors with fewer gain stages. This technique is less expensive than a transformer or optical solid-state switch but the high voltage isolation capacitors are moderately expensive. This approach is demonstrated in FIG. 1c.

Another technique, illustrated in the linear opto-isolator DAA of U.S. Pat. No. 5,946,393, is to micro power the DAA IC controlling the hook switch with microamperes of current delivered through a current limiting resistor greater than 5 Meg ohm that is connected to the line. The IC provides an internal voltage clamp function to prevent over voltage damage. A resistor greater than 5 Meg Ohm is required to meet FCC part 68 on-hook DC resistance requirements for telephone devices. The internal micro power source is then used to drive the hook switch input with as little as 0.5 uA of current. See FIGS. 1b and 1d.

In order to have adequate gain when using lowest cost high-voltage bipolar transistors, usually at least two transistors and sometimes more need to be cascaded in order to provide a current gain of several thousand in order to amplify the control current sufficiently to switch up to 120 mA of loop current. Plus, at least 1 bipolar transistor is necessary to provide a high voltage level shift function between the low voltage IC and the cascaded transistors since the voltage required to drive the base of the input transistor of the cascade is outside of the supply voltage range of the low voltage controlling IC. See FIGS. 1b, 1c and 1d.

Besides the hook switch function, the low voltage, line powered ICs in telephone or DAA circuits require external voltage regulations protection from high voltage transients, and loop current limiting for European use. More high voltage transistors are typically required to provide these functions. Additionally, other high voltage components are necessary to provide low voltage signals for on-hook functions of RING detect, line status determination and Caller ID signal processing. For example, both RING detect circuitry and Caller ID line interfacing circuitry usually use high voltage capacitors of at least 250V to block the DC component of the line. See FIG. 1c.

BRIEF SUMMARY OF THE INVENTION

The invention involves a telephone line interface circuit that is comprised of a first bipolar transistor having a base, emitter and collector, with the emitter being electrically coupled to the telephone line. A first resistor is coupled between the base and the emitter of the first transistor. A second bipolar transistor that includes a base, emitter and collector, is also included in the circuit and is connected in such a manner that the emitter of the second transistor is coupled to the base of the first transistor. A second resistor is coupled between the collector of the first transistor and the base of the second transistor. A line side circuit including a hook switch control is also part of the interface circuit.

The line side circuit has an off-hook power supply terminal that is coupled to the emitter of the second transistor, a hook switch control terminal that is coupled to the base of the second transistor, and first and second on-hook supply terminals that can be coupled to a TIP and RING of the telephone line. The hook switch control is configured to operate in an on-hook state from power supplied from the TIP and RING through the first and second on-hook supply terminals. Furthermore, the hook switch control is configured to receive a hook signal having first and second states, where the hook switch control outputs current at the hook signal terminal responding to the off-hook state of the hook signal and outputs no current at the hook signal terminal responding to the on-hook state of the hook signal.

A third resistor having high impedance is coupled between the TIP of the telephone line and the first on-hook supply terminal, and a fourth resistor having high impedance is coupled between the RING of the telephone line and the second on-hook supply terminal.

DETAILED DESCRIPTION OF THE INVENTION

Figure 1A:
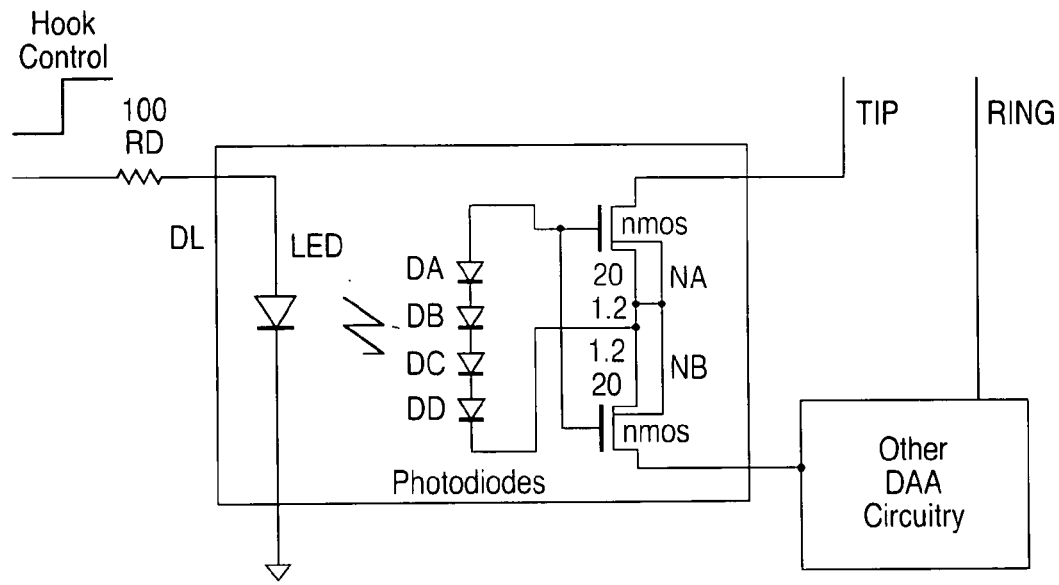
FIGS. 1a–d are circuit diagrams illustrating, examples of conventional approaches to hook switch circuits in DAA devices.
Figure 1B:
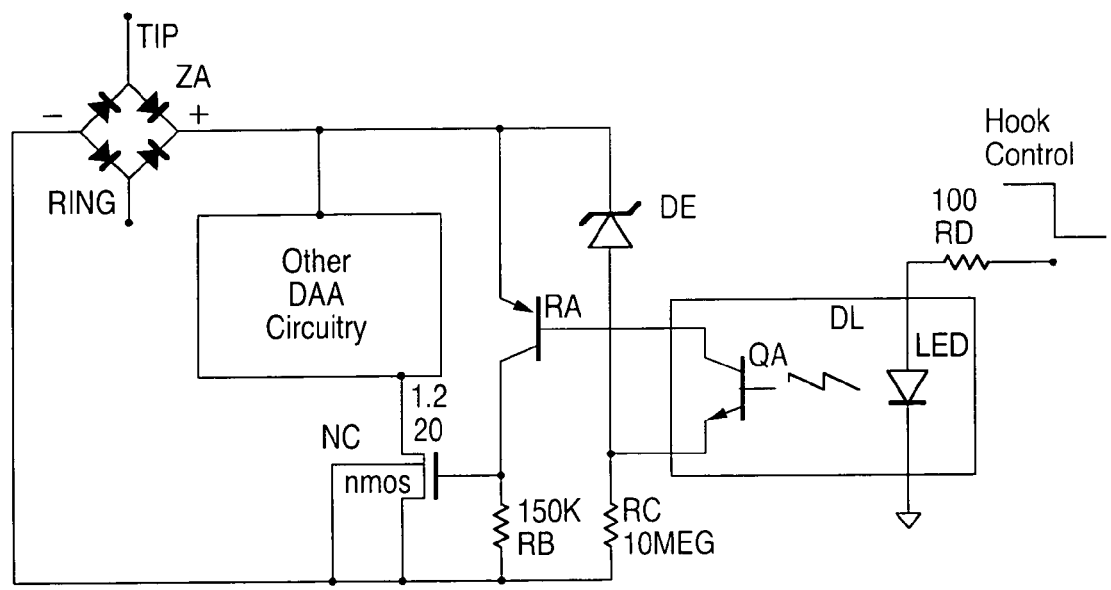
Figure 1C:
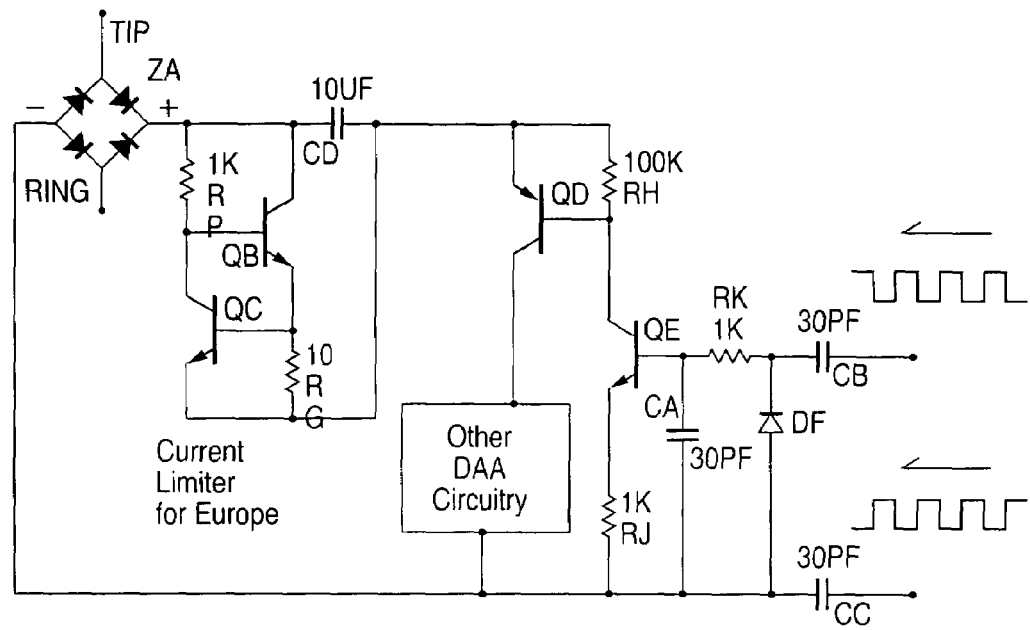
Figure 1D:
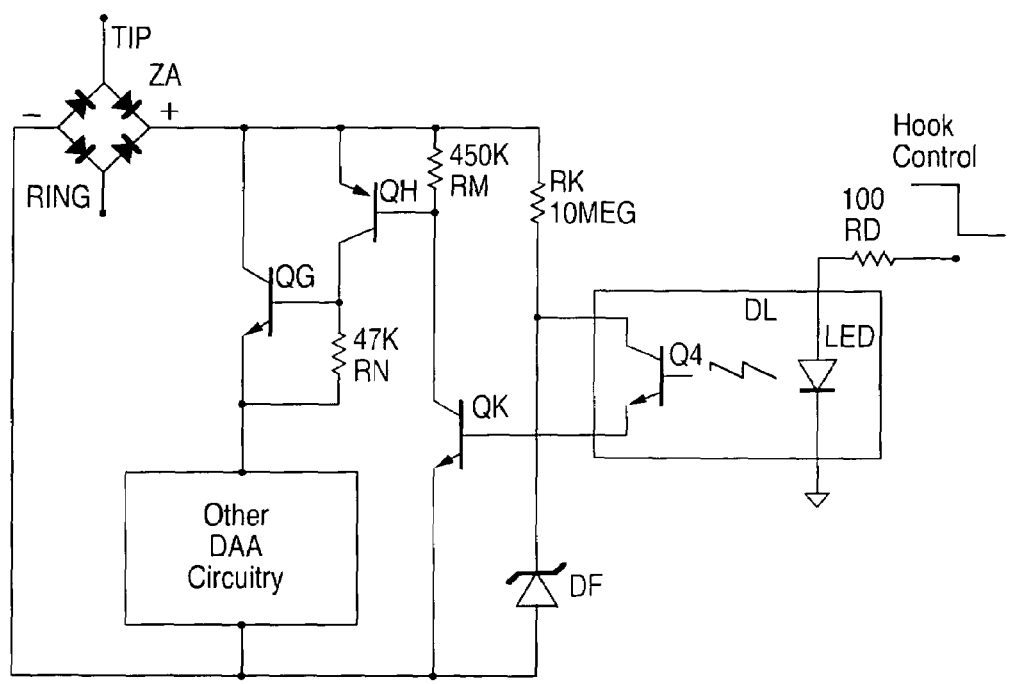

To achieve many of the functions needed or desired for electronic telephone or isolated DAA circuits, many extra and external components are typically utilized that add significant cost to the circuits. Therefore, in one aspect of the present invention, the complexity of the hook switch is reduced so that it can be fabricated with fewer and lower cost components while providing all of the functions discussed above.

In addition, for capacitor isolated DAA circuits, the capacitor driver receivers typically require additional input/output (I/O) pins. On large silicon ICs this is less of a problem. However, as advances in technology shrink IC die sizes down to the order of 1 square millimeter or smaller, ICs can become "I/O bound." This means that the number of I/O pads defines the minimum size of the IC. Therefore, another aspect of the present invention is to permit the line side DAA IC design to be small and make it possible to multiplex I/O pins for multiple functions in order prevent I/O bounding. Also, I/O multiplexing is more silicon efficient since it reduces silicon area consumed by large I/O pads and their ESD protection Structures. Finally. there is a packaging cost per I/O pin typically of around $0.01 per lead. This aspect of the present invention provides for multiplexing of other I/O signals on pins that may be applied to applications such as capacitor isolated DAAs.

The present invention discloses a novel circuit and method that permits operation using just two low-cost high-voltage bipolar transistors in conjunction with a few very low cost resistors and analog control circuitry in a low voltage IC. This combination results in a low cost electronic hook switch that also provides regulation, transient protection, and current limiting for international applications. Additionally for on-hook operation it provides a line polarity signal and a current that is proportional to the line voltage, signals used for RING detection, line status, and Caller ID functions. This aspect of the present invention is addressed in further detail in connection with FIG. 2.

The invention relates to a telephone line interlace circuit that is comprised of a first bipolar transistor having a base, emitter and collector, with the emitter being electrically coupled to the telephone line. A first resistor is coupled between the base and the emitter of the first transistor. A second bipolar transistor that includes a base, emitter and collector, is also included in the circuit and is connected in such a manner that the emitter of the second transistor is coupled to the base of the first transistor. A second resistor is coupled between the collector of the first transistor and the base of the second transistor. A line side circuit including a hook switch control is also part of the interface circuit.

The line side circuit has an off-hook power supply terminal that is coupled to the emitter of the second transistor, a hook switch control terminal that is coupled to the base of the second transistor, and first and second on-hook supply terminals that can be coupled to a TIP and RING of the telephone line. The hook switch control is configured to operate in an on-hook state from power supplied from the TIP and RING through the first and second on-hook supply terminals. Furthermore, the hook switch control is configured to receive a hook signal having first and second states, where the hook switch control outputs current at the hook signal terminal responding to the off-hook state of the hook signal and outputs no current at the hook signal terminal responding to the on-hook state of the hook signal.

A third resistor having high impedance is coupled between the TIP of the telephone line and the first on-hook supply terminal, and a fourth resistor having high impedance is coupled between the RING of the telephone line and the second on-hook supply terminal.

In one embodiment of the invention, the first and second transistors are low-beta transistor devices.

The line side circuit may also include a current mirror circuit interposed between the first and second on-hook supply terminals and the hook switch control circuit. This current mirror circuit is configured to produce an output current signal having a magnitude that is proportional to a line voltage at the TIP and RING of the telephone line.

In another embodiment of the invention, the line side circuit also includes a polarity steering regenerative switch circuit interposed between the first and second on-hook supply terminals and the current mirror circuit. In a particular embodiment of the invention, the polarity steering regenerative switch circuit includes a buffer for generating a logic level line polarity signal.

In still another embodiment of the invention, the line interface circuit includes a first isolation capacitor that is coupled between the first on-hook supply terminal and a modem side circuit. A second isolation capacitor is also coupled between the second on-hook supply terminal and a modem side circuit. In this embodiment, the line side circuit further includes a receiver circuit coupled to the first on-hook supply terminal and configured to receive a data signal from the TIP and RING. This receiver circuit is able to transmit the received data signal over the first isolation capacitor to the modem side circuit. A transmitter circuit is coupled to the second on-hook supply terminal. This transmitter circuit is configured to receive another data signal from modem side circuit over the second isolation capacitor and transmit the another data signal to the TIP and RING.

Figure 2:
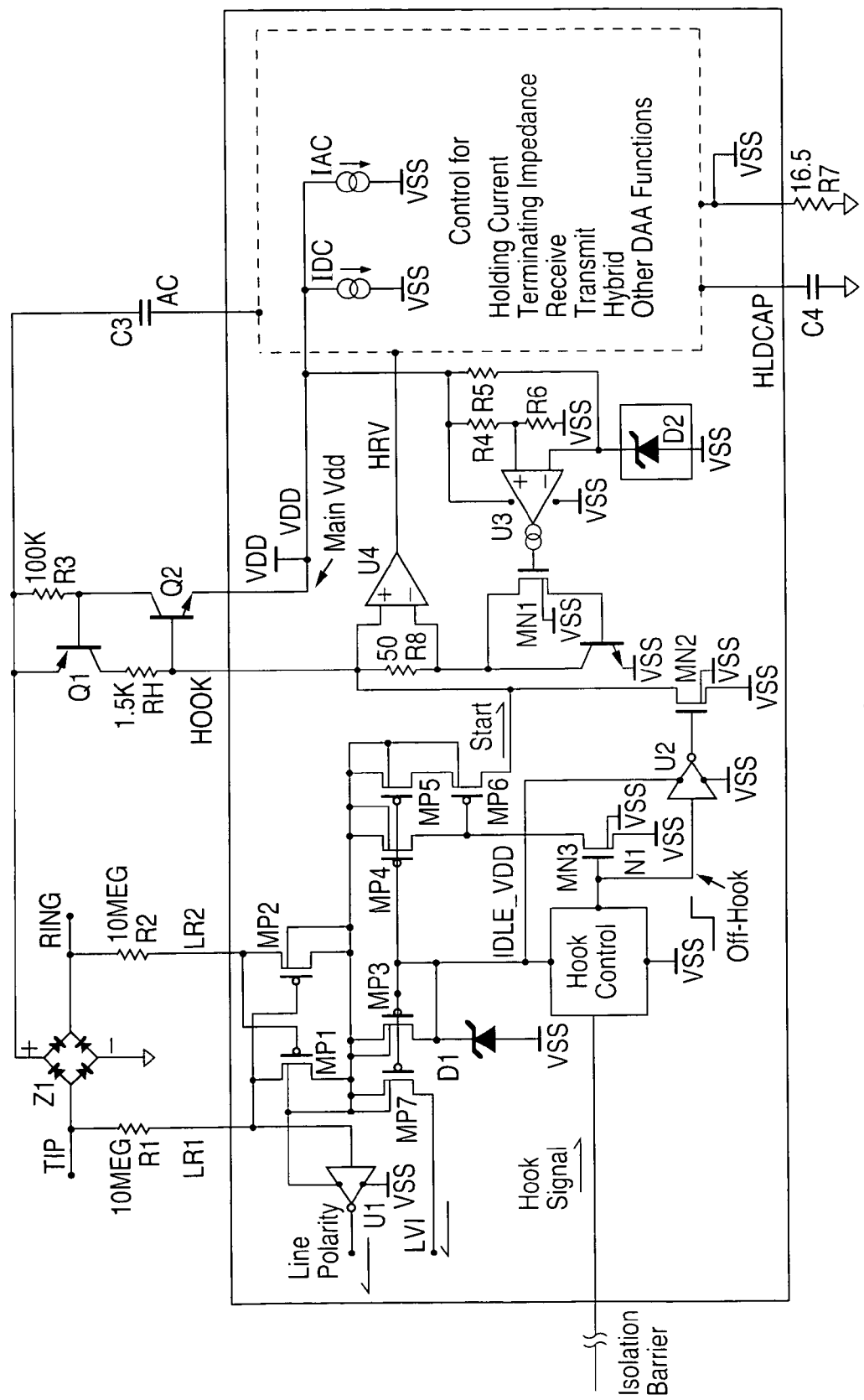
FIG. 2 is a circuit diagram illustrating one exemplary embodiment of a hook switch within a DAA in accordance with one aspect of the present invention.

FIG. 2 is a circuit diagram illustrating one exemplary embodiment of a hook switch within a DAA in accordance with one aspect of the present invention. In FIG. 2, an embodiment of a hook switch structure according to the present invention is illustrated, where it is shown as part of a line side DAA controlled by a low voltage IC whose internal circuitry is drawn inside the large block in the diagram. The hook switch structure includes two high-voltage bipolar transistors: a PNP transistor Q1 and a NPN transistor Q2 along with resistors RH and R3. These devices are connected in a regenerative feedback manner to form a bi-stable latch. It is this regenerative structure that allows use of very low beta transistors that still have sufficient gain due to regeneration to allow turning on the hook switch with as little as a 100 nA while still being capable of conducting over 120 mA. Also, the hook switch structure permits the off-hook function to be performed with only two diode drops rather than the three diode voltage drops that are typically required in conventional semi-conductor off-hook circuits.

Note that the magnitude of resistor R3 may be varied to determine the level of current needed at the base of Q2 to turn on the bi-stable latch. During on-hook operation, the hook switch is latched off; that is both Q1 and Q2 are not conducting. During off-hook, both of these transistors turn on, latching the hook switch circuit on. Either sinking or sourcing currents into the base of Q2 can change the state of the bi-stable latch of the hook switch structure. In FIG. 2, the hook switch structure is triggered into the off-hook state by the Start signal, which drives current to the base of transistor Q2. To force the hook switch structure into the on-hook state, the base of transistor Q2 is essentially grounded to VSS, which is obtained in the example shown by turning on NMOS transistor MN2.

This hook switch structure, according to one aspect of the present invention, allows use of very low beta, low cost 700V bipolar transistors Q1, Q2 now being produced in very high volume for electronic ballasts for energy efficient Compact Fluorescent Light bulbs. These 700V transistors have betas lower than 300V transistors, but have similar costs for 1 Watt devices. By using these higher voltage, but lower beta transistors, DAA designers can replace expensive semiconductor snap-over surge suppressor diodes with a Metal Oxide Varistor or MOV, resulting in a net savings in component costs. The MOV is not shown in the figures, but would be disposed between the TIP and RING in order to provide surge protection.

Snap-over surge suppressors are used because they typically have a well-defined trigger point with about a ±20% tolerance. They pull no current for voltages up to the trigger point, around 250–350V. When the trigger point is reached, the voltage across them collapses to only a few volts even at surge currents of up to 100 Amps for as long as the current exceeds the holding current limit, typically in excess of 150 mA. Once the current falls below the holding current limit, the diode turns off. Although they are excellent surge suppressors snap-over diodes have become one of the most expensive non-IC electronic components in a DAA.

Although much cheaper, MOVs clamp over a two to one voltage range and consequently cannot be used to protect DAAs if a 350V breakdown voltage hook switch is used. An MOV has a voltage to current characteristic like a poor bi-directional zener diode. A 300V MOV may pull less than 1 mA at 250V but on a 100 Amp surge its clamping voltage may exceed 600V. However, if the hook switch has more than a two to one breakdown voltage to peak operating voltage, then an MOV surge suppressor can be a lower cost surge solution.

In the embodiment shown, a low current on-hook power supply voltage (IDLE_$V_{DD}$ in FIG. 2) is active in both the on-hook and off-hook states, where IDLE_$V_{DD}$ receives line power through one of high impedance resistors R1 or R2 (shown here as 10 Meg devices) depending on the line polarity. Note that one advantage of the 10 Meg resistors R1 and R2 is that they may be extremely low cost high voltage components. The on-hook power supply involves PMOS transistors MP1 and MP2, where the gate of transistor MP1 is coupled to node LR1 and the gate of transistor MP2 is coupled to node LR2. When node LR1 is low, then transistor MP2 is activated, transistor MP1 is deactivated (since LR2 will be high), and power is supplied from node LR2. Similarly, when node LR2 is low, then MP1 is active and power is supplied from node LR1. The current provided by transistors MP1 or MP2 passes through PMOS transistor MP3 to the IDLE_$V_{DD}$ node. This on-hook supply IDLE_$V_{DD}$ is used to power the hook control circuitry and to provide the small amount of current necessary to initiate hook switch turn on through the generation of the START signal by PMOS transistor MP6.

While the IDLE_$V_{DD}$ voltage may be obtained by simply using diodes, by using PMOS transistors MP1 and MP2, the supply voltage may be obtained more efficiently and, in the process, provide a basis for a LINE POLARITY signal that may be used for analyzing activity on the TIP and RING for applications such as RING detection, line status determination, and Caller ID. In the example of FIG. 2, buffer U1 generates the LINE POLARITY signal based on the state of node LR1 and using power supplied by transistors MP1 and MP2.

Besides providing power for on-hook circuitry, resistors R1 and R2 may also be used to sense voltages on TIP and RING necessary for providing line polarity signals and line voltage signals that may be used for RING detection, line status determination, and Caller ID purposes. In FIG. 2, signal $LV_1$ is a fractional current output from a current mirror composed of transistors MP7, MP3, MP4, MP5 and MP6. This mirror receives current from the 10 Meg resistor R1 or R2 tied to the most positive biased line either TIP or RING. Consequently, the current output from $LV_1$ is proportional to the absolute line voltage across TIP and RING.

PMOS transistors MP1 and MP2 form a polarity steering regenerative switch. Normally, one of the two 10 Meg resistor R1, R2 input nodes, $LR_1$ and $LR_2$, is positive and the other one is biased negative to one diode drop below the ground voltage, where the diode voltage drop occurs in the diodes of the bridge between TIP and RING. The polarity steering regenerative switch ensures that only the positive $LR_1$ or $LR_2$ input is tied to the current mirror preventing loss of current to the negative biased input. The polarity steering regenerative switch also provides a logic level line polarity signal to buffer amplifier U1. As noted above, the line voltage current output from the $LV_1$ signal and the LINE POLARITY signal may be processed to determine what activity is taking place on the TIP and RING in the on-hook state. This processing is useful for RING detection, line status determination, and Caller ID applications. The processing may take place on the line side, for non-isolated telephone interfaces, or the line voltage and polarity may be encoded and sent across the DAA isolation barrier for signal processing on the system side, e.g. by a host processor. See the techniques described in U.S. patent application Ser. Nos. 10/013,901 and 10/341,760. Because $LV_1$ provides a low current output proportional to the line voltage, it can be easily encoded to frequency by using the current to repeatedly charge a capacitor to a fixed trigger voltage that then discharges the capacitor repeating the cycle, e.g., obtaining a voltage to frequency conversion. A frequency output proportional to line voltage is ideal for digital RING and line voltage processing since frequency can be easily converted to a digital value on the system side using a simple counter.

One attribute of this hook switch 200 in the off-hook state is that transistor Q2, together with resistors R4, R5, R6, amplifier U3, diode D2, and transistors MN1 and Q3, operates as a series voltage regulator to supply all circuits within the IC ($V_{DD}$ in FIG. 2). Moreover, by adding DC and AC audio signal current sources. e.g. IDC and IAC, coupled to the HOOK node, a fixed DC voltage drop and an AC signal voltage may be generated across the hook resistor RH. If the DC voltage drop across resistor RH is greater than the AC audio signal peak to peak voltage, then adequate headroom for low distortion audio signals is ensured. This operating mode can be referred to as the linear operation mode of the hook switch 200.

Current limiting in order to meet EU TBR-21 regulatory requirements is implemented by limiting the sum of transistor Q2's emitter current and the current through HOOK resistor RH to a fixed value. An advantage when in current limiting mode is that the power that needs to be dissipated, up to 2 watts, is shared between resistor RH and transistor Q2. This reduces the heat dissipation requirements of transistor Q2 allowing a smaller and lower cost package to be used.

The DC and AC characteristics in off-hook mode are synthesized by actively controlling the sink current on the NOOK node as a function of a number of DC and AC parameter inputs. The following describes in detail how this is achieved.

Description of the linear operation mode, DC and AC characteristics:

One major difficulty, when interfacing with a telephone line, is to generate a distortion free transmit signal into the telephone line, while at the same time powering the chip off the telephone line. When the chip draws a DC current, it is not necessarily introducing distortion. However, in practice, amplifiers and other circuitry draw some current that varies with the transmit and receive signaling (and this varying current is added to the transmit audio signal, which results in considerable distortion.

Figure 3:
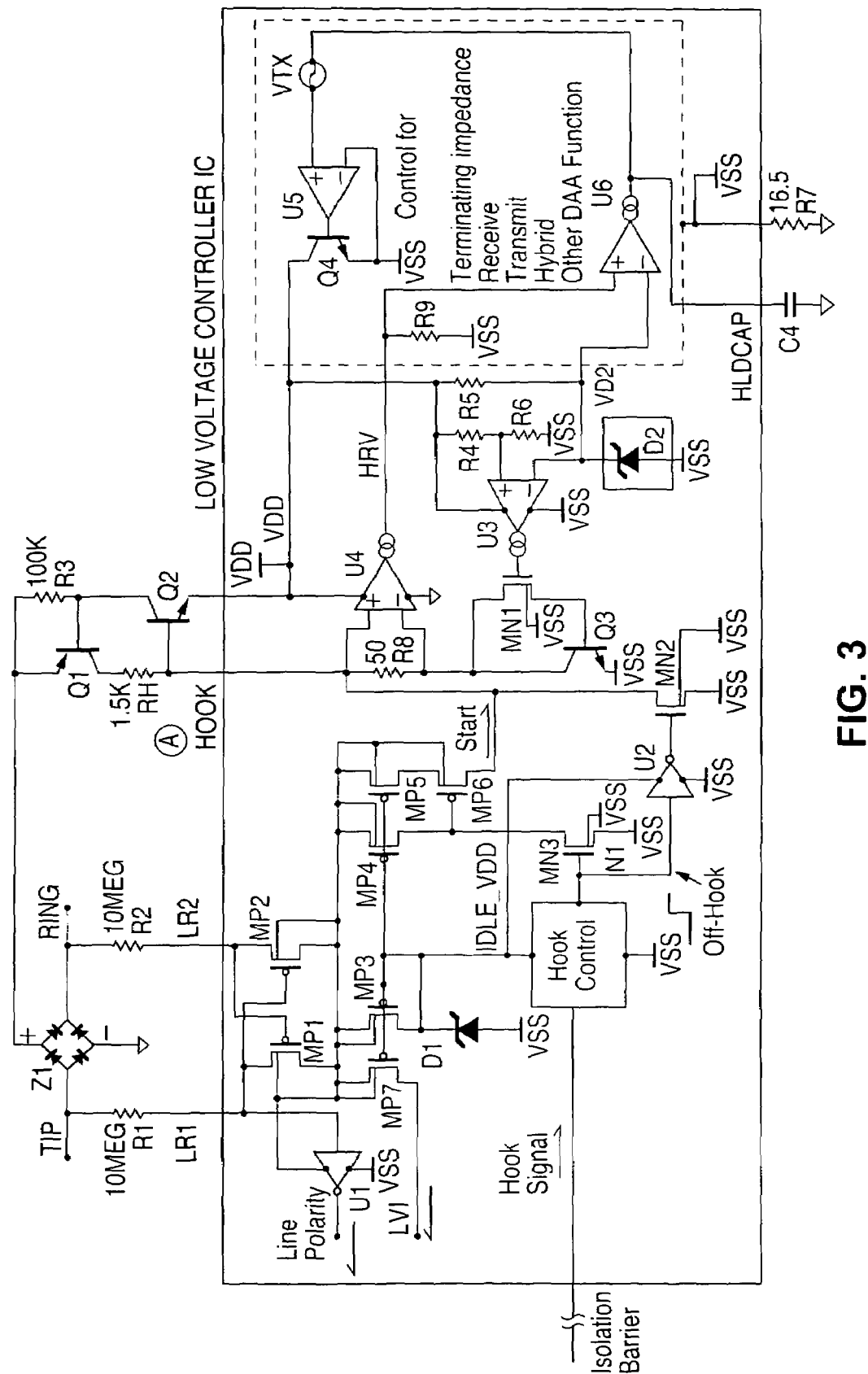
FIG. 3 is a circuit diagram illustrating another exemplary embodiment of a hook switch within a DAA in accordance with another aspect of the present invention relating to the control of DC and AC characteristics of the circuit in a linear operation mode.

FIG. 3 is a circuit diagram illustrating another exemplary embodiment of a hook switch within a DAA in accordance with another aspect of the present invention relating to the control of DC and AC characteristics of the circuit in a linear operation mode. As shown in FIG. 3, a transmit amplifier (composed of amplifier U5 and transistor Q4 in this example) and a "holding" circuit (composed of amplifier U6, capacitor C4, resistors R8, R9 and amplifier U4) control the AC signal pushed into the line and the DC loop (line) current for adequate headroom, respectively. The embodiment of FIG. 3 also includes a current sense current controlled voltage amplifier (composed of resistor R8, amplifier U4 and resistor R9) with gain equal to: (gm*R8*R9). The output of this current sense current controlled voltage amplifier, together with the voltage reference $V_{D2}$, drives a low gain voltage controlled differential current amplifier, which is capacitively loaded by the external HLDCAP capacitor. The output of the low gain voltage controlled differential current amplifier drives the transmit amplifier (U5, Q4, R7). This closes the loop and causes transistor Q4 to sink an amount of DC current so that the voltage across the HOOK resistor RH equals:

($R_H \times V_{D2}$)/(gm×$R_8$×$R_9$).

The value of the HLDCAP capacitor and the gain of amplifier U6 are chosen such that this feedback loop is active for frequencies below 80 Hz or so, thereby effectively synthesizing a large inductive impedance presented to the telephone line pair. Also note that the voltage reference provided by diode D2 is a shunt regulator, which may be implemented in a number of ways including a zener diode. MOS diodes or stacked diodes, for example.

Figure 4:
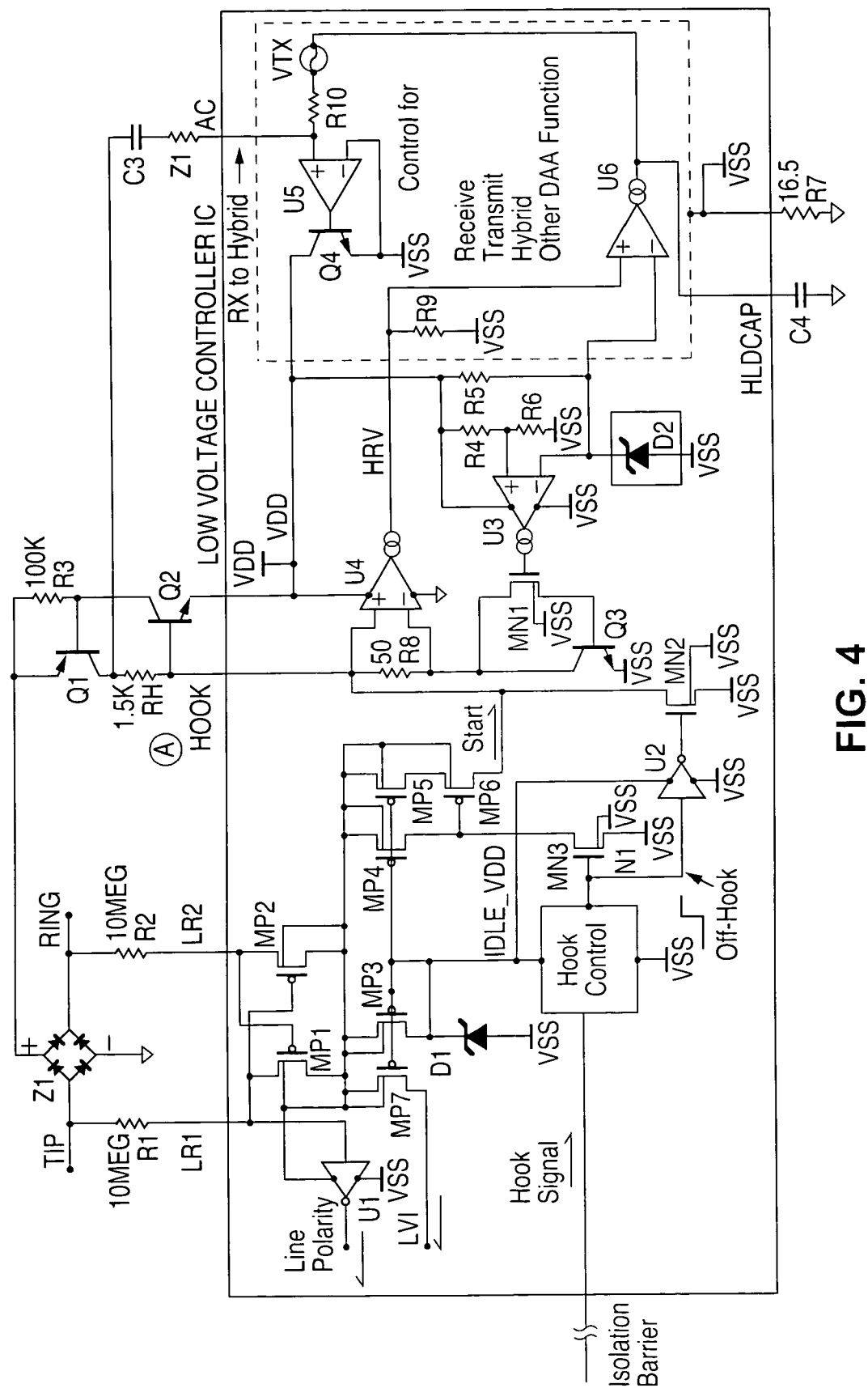
FIG. 4 is a circuit diagram illustrating yet another exemplary embodiment of a hook switch within a DAA in accordance with another aspect of the present invention relating to synthesizing an AC line impedance.

Note that all of the IC's current flows through resistor 117 since it is part of the transmit transconductance amplifier (amplifier U5, transistor Q4 and resistor R7). The AC voltage source $V_{TX}$ alone controls the AC current pushed into the line, which is equal to $V_{TX}/R_7$. As a result, the transmit current is essentially distortion free. An AC line impedance can also be synthesized by adding the appropriate impedance $Z_1$ between the telephone line and the input of the transmit amplifier, which is illustrated in the embodiment of FIG. 4. The resulting DAA AC impedance equals: $Z_{in} \sim Z_1 \times R_7 / R_{10}$.

Figure 5:
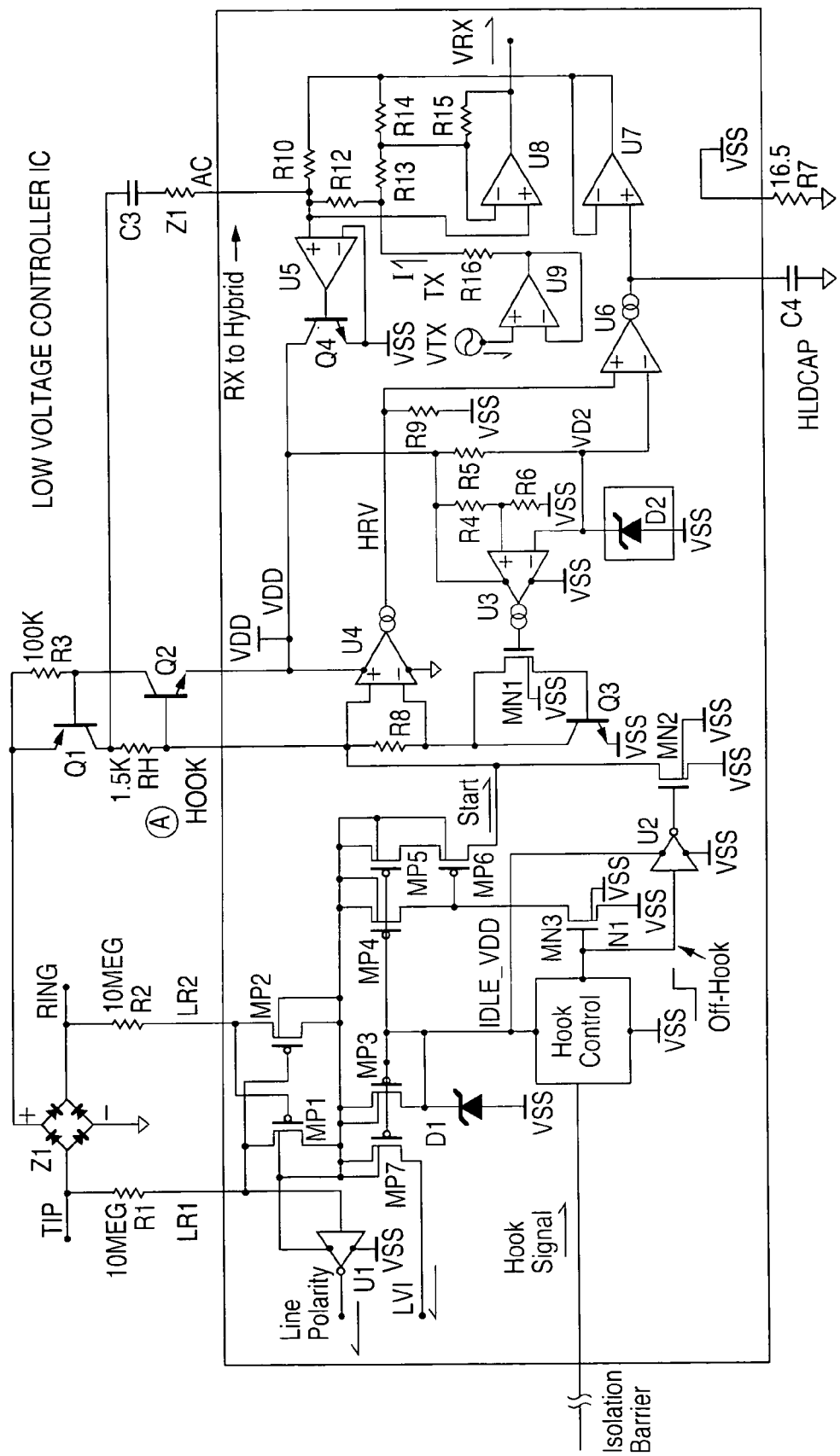
FIG. 5 is a circuit diagram illustrating still another exemplary embodiment of a hook switch within a DAA in accordance with another aspect of the present invention relating to providing full duplex operation over a two-wire telephone line.

FIG. 5 is a circuit diagram illustrating still another exemplary embodiment of a hook switch within a DAA in accordance with another aspect of the present invention relating to providing full duplex operation over a two-wire telephone line. The diagram shows an example of a hybrid circuit implementation, which allows a full duplex operation over the two-wire telephone line. It essentially separates transmit and receive signals that can be sent, respectively received, over the isolation barrier. In the embodiment of FIG. 5, a received voltage signal VRX is generated at the output of amplifier U8 that reflects the AC data signal received via the TIP and RING pair and which passes through transistor Q1 capacitor C3 and resistor Z1. Full duplex operation is possible because the transmit voltage signal VTX is transformed into a transmit current IRX that drives the transmit transconductance amplifier formed by the combination of amplifier U5, resister R7 and transistor Q4. The transmit transconductance amplifier, in turn, drives the signal through the bi-stable latch formed from the combination of transistors Q1, Q2 and resistors R3 and RH in order to put the transmit signal onto the TIP and RING pair.

Figure 6:
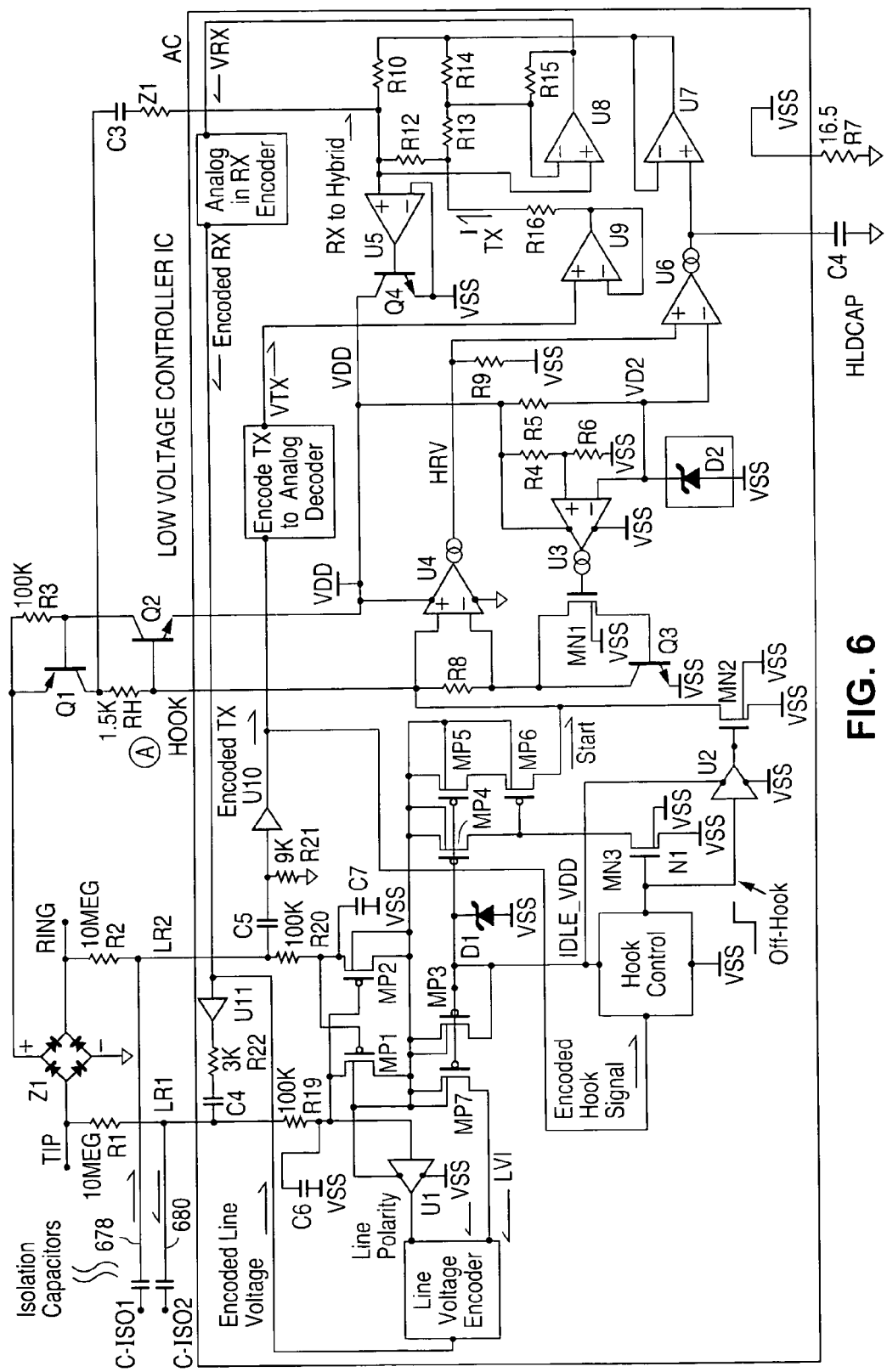
FIG. 6 is a circuit diagram illustrating yet another exemplary embodiment of a hook switch within a DAA in accordance with another aspect of the present invention relating provision of an encoded line voltage signal that may be transmitted across a capacitive isolation barrier.

FIG. 6 is a circuit diagram illustrating yet another exemplary embodiment of a hook switch within a DAA in accordance with another aspect of the present invention relating to provision of an encoded line voltage signal that may be transmitted across a capacitive isolation barrier. The figure shows an isolated DAA version that may be used with isolation capacitors C-ISO1 and C-ISO2. This circuit shows the functions of FIG. 5 plus multiplexing on I/O pins 678 and 680 that are used to connect the isolation capacitors to nodes $LR_1$ and $LR_2$.

In a capacitor isolated DAA, I/O pins 678, 680 can be used as part of the isolation capacitor driver receiver. Because the telephone line voltage signals into $LR_1$ and $LR_2$ are low frequency from DC to 4 KHz, frequencies above 4 KHz can be used for sending encoded signals across the isolation capacitors C-ISO1 and C-ISO2. These pins 678, 680 can be used for transmitting, receiving, or a differential reference. In this exemplary embodiment, $LR_1$ is shown with a transmitter and LR2 is shown with a receiver. In this example, the RC networks formed by resistor R19 and capacitor C6 on $LR_1$ and resistor R20 and capacitor C7 on $LR_2$, block any high frequency components from the low frequency line voltage circuit. Capacitors C4 and C5 pass the high frequency encoded signals. Resistors R21 and R22 provide a termination impedance. For the receiver, resistor R21 and capacitor C5 form a high pass filter blocking the low frequency line voltage signals. Resistor R22 provides impedance balance on the transmitter. Because the DC and low frequency line voltage components go through large value resistors of about 100K for R19 and R20, and 10 Meg for R1 and R2, these have very little loading effect on the high frequency isolation capacitor signals that have drive and receive impedances of around 3K ohms.

In the embodiment of FIG. 6, a high frequency encoded transmit signal is received via isolation capacitor C-ISO1 and I/O pin LR2. The transmit signal passes across capacitor C5, which isolates buffer U10 from the DC voltage present on I/O pin LR2 due to the RING terminal. The encoded transmit signal output from buffer U10 is received by an encoded transmit to analog decoder, such as a modified digital-to-analog encoder, which transforms the encoded transmit signal into a transmit voltage signal VTX. VTX is input into amplifier U9, which transforms VTX into a transmit current signal ITX for input to amplifier U5. Amplifier U5 then drives Q4 responsive to ITX in order to modulate the current on TIP and RING through the bi-stable latch circuit formed with Q1 and Q2. Note that an encoded transmit signal may also be input to the circuit off FIG. 6 via I/O ping LR2, which is input to the hook control circuit for decoding and generation of an off-hook signal for control of the bi-stable latch hook switch circuit.

Similarly, in the embodiment of FIG. 6, a receive signal from the TIP and RING terminals is received across capacitor C3 and resistor Z1 into a receiver circuit that includes a network of resistors R10, R12, R13, R14 and receive amplifier U8. Amplifier U8 transforms the received signal into a received voltage signal VRX, which is input into an analog to receive encoder circuit. The analog to receive encoder circuit is a circuit that encodes the received voltage signal VRX in a form that has high speed transitions that may be transmitted across an isolation capacitor, such as a pulse-width modulation (PWM) encoder or a voltage to frequency converter (VFC). An encoded receive signal is then output to buffer U11, which drives the encoded receive signal across resistor R22 and capacitor C4, where capacitor C4 isolates buffer U11 loom the DC voltage present on I/O pin LR1 from the TIP terminal. Buffer U11 thus drives the encoded receive signal onto I/O pin LR1 and across isolation capacitor C-ISO2. In this manner, I/O pins LR1 and LR2 may be multiplexed so that power is received from the TIP and RING terminals and the same pins are used for transmitting and receiving signals to the IC. This permits the number of pins for the IC containing the interface circuit to be reduced, e.g. to seven pins in the example shown.

Any of a number of AC encoding methods not dependent on DC can be used to send encoded signals across the capacitors and which occupy frequencies above 4 KHz. For example, various analog encoding techniques may be used; such as, pulse width modulation, frequency modulation, phase modulation, pulse amplitude modulation, amplitude modulation of a high frequency carrier, etc. Or, various digital encoding techniques can be used to send pulses edges across or to modulate one of the above analog modulation methods with a digital signal.

Different types of signals or modulation may be used for on-hook, off-hook, and other modes. Multiplexing $LR_1$ and $LR_2$ reduces the line side IC pin count by two without adding any extra components.

In one aspect of the present invention, only two bipolar high voltage transistors are required without some isolated power source; such as power sent across caps, photovoltaic stack, etc. This also allows use of 700V transistors and leads to cost reduction in surge suppressors.

In another aspect of the present invention, the invention results in a low number of external parts and may be implemented using inexpensive external parts to synthesize all off-hook and on-hook line interface functions with this aspect. In one embodiment, the present invention forms the heart of a non-isolated telephone interface IC which may sell in higher volumes than a full DAA chipset.

In yet another aspect of the present invention, an embodiment of the invention results in a low pin count for a low voltage IC controller. For example, a line side DAA chip according to this embodiment of the present invention only has eight pins while the Silicon Labs solution has 16. Part of this pill reduction involves the addition of a virtual ground and the fact that we can multiplex $LR_1$ and $LR_2$ with the capacitor driver receiver and drivers.

In still another aspect of the present invention, the on-hook current consumption allows line powered Caller ID interfacing without exceeding the 5 Meg on-hook DC resistance limits. (Caller ID circuits can pull more line current during RINGing or if the line is already off-hook.)

In an aspect of the present invention involving multiplexing of $LR_1$ and $LR_2$ with the isolation capacitors C-ISO1 and C-ISO2 in the actual line side IC, we are multiplexing the common and the receiver. This gives better balance for the receiver. The transmitter capacitor driver comes out a separate pin.

In a further aspect of the present invention, the interface allows for low cost line voltage interface by using 10 Meg resistors to sense the line voltage.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein. is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A hook switch circuit for use in a telephone line interface circuit, the circuit comprising:
    a PNP transistor having a base, an emitter and a collector;
    an NPN transistor having a base, an emitter and a collector, where the emitter of the NPN transistor is coupled to the base of the PNP transistor;
    a first resistor coupled between the base of the NPN transistor and the emitter of the PNP transistor; and
    a second resistor coupled between the base of the PNP transistor and the emitter of the PNP transistor.

2. The circuit of claim 1, the circuit further including a hook control circuit for receiving a hook control signal across an isolation barrier and, responsive thereto, generating an off-hook signal at an output of the hook control circuit, where the output of the hook control circuit is electrically coupled to the base of the NPN transistor.

3. The circuit of claim 2, the circuit further including:
    a first metal-oxide semiconductor (MOS) transistor having a gate, a source and a drain, where the drain of the MOS transistor is electrically coupled to the base of the NPN transistor and the source of the MOS transistor is electrically coupled to a ground supply terminal; and
    a first buffer having an input and an output, where the input of the first buffer is electrically coupled to the output of the hook control circuit and the output of the first buffer is coupled to the gate of the MOS transistor.

4. The circuit of claim 3, the circuit further including:
    a first input/output pin configured to be coupled to a first terminal of a telephone line pair through a first high impedance resistor;
    a second input/output pin configured to be coupled to a second terminal of a telephone line pair through a second high impedance resistor;
    a polarity steering regenerative switch electrically coupled to the first and second input/output pins such that the switch receives power from the first and second terminals of the telephone line pair through the first and second high impedance resistors;
    a current mirror electrically coupled to the polarity steering regenerative switch, where the current mirror is configured to generate an idle power supply voltage from a line voltage obtained from the first and second terminals of the telephone line pair through the polarity steering regenerative switch; and
    where the hook control circuit is configured to operate using the idle power supply voltage.

5. The circuit of claim 4, the circuit further including a second buffer having an input and an output, where the input of the second buffer is electrically coupled to one of the first and second input/output pins and the second buffer is configured to operate using power supplied by the polarity steering regenerative switch.

6. The circuit of claim 5, where the current mirror further includes an additional transistor configured to generate a current proportional to the line voltage at the first and second terminals of the telephone line pair.

7. The circuit of claim 4, the circuit further including:
    a second MOS transistor having a gate, drain and source, where the gate of the second MOS transistor is electrically coupled to the output of the hook control circuit, the drain of the second MOS transistor is electrically coupled to the ground supply terminal, and the source of the second MOS transistor is electrically coupled to the current mirror; and
    a third MOS transistor having a gate, drain and source and disposed between the output terminal of the hook control circuit and the base of the NPN transistor, where the gate of the third MOS transistor is electrically coupled to the drain of the second MOS transistor, the drain of the third MOS transistor is electrically coupled to the current mirror, and the source of the third MOS transistor is electrically coupled to the base of the NPN transistor such that generation of the off-hook signal results in a start signal that drives the base of the NPN transistor using current from the current mirror.

8. The circuit of claim 4, the circuit further including one of a transmit circuit and a receive circuit electrically coupled to one of the first and second input/output pins through a first isolation capacitor.

9. The circuit of claim 8, the circuit further including another one of the transmit circuit and the receive circuit electrically coupled to another one of the first and second input/output pins through a second isolation capacitor.

10. A telephone line interface circuit, the circuit comprising:
    a first bipolar transistor having a base, emitter and collector, the emitter being electrically coupled to the telephone line;

a first resistor coupled between the base and the emitter of the first transistor;

a second bipolar transistor having a base, emitter and collector, the emitter of the second transistor being coupled to the base of the first transistor;

a second resistor coupled between the collector of the first transistor and the base of the second transistor;

a line side circuit including a hook switch control, the line side circuit having an off-hook power supply terminal coupled to the emitter of the second transistor, a hook switch control terminal coupled to the base of the second transistor, and first and second on-hook supply terminals for coupling to a TIP and RING of the telephone line, where the hook switch control is configured to operate in an on-hook state from power supplied from the TIP and RING through the first and second on-hook supply terminals, and where the hook switch control is configured to receive a hook signal having first and second states, where the hook switch control outputs current at the hook signal terminal responding to the off-hook state of the hook signal and outputs no current at the hook signal terminal responding to the on-hook state of the hook signal;

a third resistor having high impedance and coupled between the TIP of the telephone line and the first on-hook supply terminal; and a fourth resistor having high impedance and coupled between the RING of the telephone line and the second on-hook supply terminal.

11. The telephone line interface circuit of claim 10, where the line side circuit further includes a current mirror circuit interposed the first and second on-hook supply terminals and the hook switch control circuit, where the current mirror circuit is configured to produce an output current signal having a magnitude that is proportional to a line voltage at the TIP and RING of the telephone line.

12. The telephone line interface circuit of claim 11, where the line side circuit further includes a voltage to frequency converter for converting the output current signal to a frequency signal.

13. The telephone line interface circuit of claim 11, where the line side circuit further includes a polarity steering regenerative switch circuit interposed the first and second on-hook supply terminals and the current mirror circuit.

14. The telephone line interface circuit of claim 13, where the polarity steering regenerative switch circuit includes a buffer for generating a logic level line polarity signal.

15. The telephone line interface circuit of claim 11, the line interface circuit including:

a first isolation capacitor coupled between the first on-hook supply terminal and a modem side circuit; and a second isolation capacitor coupled between the second on-hook supply terminal and a modem side circuit; and where the line side circuit further includes:

a receiver circuit coupled to the first on-hook supply terminal and configured to receive a data signal from the TIP and RING and transmit the received data signal over the first isolation capacitor to the modem side circuit, and a transmitter circuit coupled to the second on-hook supply terminal and configured to receive another data signal from the modem side circuit over the second isolation capacitor and transmit the another data signal to the TIP and RING.

16. The telephone line interface circuit of claim 10, where the first and second transistors further comprise low-beta transistor devices.

* * * * *